US008666526B2

(12) United States Patent  
Yokoyama et al.

(10) Patent No.: US 8,666,526 B2  
(45) Date of Patent: Mar. 4, 2014

(54) TRANSMISSION DEVICE, TRANSMISSION SYSTEM, TRANSMISSION METHOD, AND COMPUTER PROGRAM PRODUCT FOR SYNTHESIZING AND TRANSMITTING AUDIO TO A REPRODUCTION DEVICE

(75) Inventors: Issei Yokoyama, Matsumoto (JP); Masahiko Honda, Sapporo (JP); Tomohiro Nomizo, Shiojiri (JP); Toru Karasawa, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 827 days.

(21) Appl. No.: 12/499,827

(22) Filed: Jul. 9, 2009

(65) Prior Publication Data

US 2010/0026911 A1     Feb. 4, 2010

(30) Foreign Application Priority Data

Jul. 31, 2008  (JP) .................................. 2008-197315

(51) Int. Cl.  
    *G06F 17/00*  (2006.01)
(52) U.S. Cl.  
    USPC .......................................................... 700/94
(58) Field of Classification Search  
    USPC .......................................................... 700/94  
    See application file for complete search history.

(56) References Cited

U.S. PATENT DOCUMENTS 5,159,703 A * 10/1992 Lowery ........................... 455/42  
6,979,769 B1 * 12/2005 Majima et al. .................. 84/645

FOREIGN PATENT DOCUMENTS

| JP | 02-050381 A | 2/1990 |
| JP | 2002-055688 A | 2/2002 |
| JP | 2002-169567 A | 6/2002 |
| JP | 2005-165244 A | 6/2005 |
| JP | 2006-191412 | 7/2006 |
| JP | 2006-191412 A | 7/2006 |
| JP | 2006-349772 A | 12/2006 |
| JP | 2008-009253 | 1/2008 |
| JP | 2008-009253 A | 1/2008 |
| JP | 2008-147846 A | 6/2008 |
| WO | WO-2008-072434 A | 6/2008 |

* cited by examiner

*Primary Examiner* — Joseph Saunders, Jr.  
(74) *Attorney, Agent, or Firm* — ALG Intellectual Property, LLC

(57) ABSTRACT

A transmission device includes: a reproduction audio producing unit which produces reproduction audio; a continuous audio producing unit which produces continuous audio; a synthesized audio producing unit which synthesizes the reproduction audio and the continuous audio to produce synthesized audio; a capture audio data producing unit which captures the synthesized audio to produce capture audio data; and a transmitting unit which transmits the capture audio data to a reproduction device.

9 Claims, 11 Drawing Sheets

TRANSMISSION DEVICE, TRANSMISSION SYSTEM, TRANSMISSION METHOD, AND COMPUTER PROGRAM PRODUCT FOR SYNTHESIZING AND TRANSMITTING AUDIO TO A REPRODUCTION DEVICE

CROSS-REFERENCE

The present application claims priority from Japanese Patent Application No. 2008-197315 filed on Jul. 31, 2008, which is hereby incorporated by reference in its entirety.

BACKGROUND

Japanese Patent Publication No. 2008-9253 discloses an image display apparatus which captures images and transmits image data to an external device. Japanese Patent Publication No. 2006-191412 proposes a technology for capturing audio. These technologies can be combined to capture audio and transmit audio data to an external reproduction device.

According to the method for capturing audio and producing audio data, however, time lag is produced in capturing audio by switching between audio presence condition and audio absence condition at the time of temporary stop and repetitive audio reproduction by a user or on other occasions. In this case, sufficient audio data is not supplied to the reproduction device by accumulation of the time lag, and there is a possibility of inappropriate reproduction of audio such as break off of audio in the middle of reproduction.

SUMMARY

Various embodiments may provide a transmission device, a transmission system, a computer program product capable of capturing audio and producing and transmitting audio data such that a reproduction device having received the audio data can appropriately reproduce the audio.

A transmission device according to at least one embodiment of the disclosure includes: a reproduction audio producing unit which produces reproduction audio; a continuous audio producing unit which produces continuous audio; a synthesized audio producing unit which synthesizes the reproduction audio and the continuous audio to produce synthesized audio; a capture audio data producing unit which captures the synthesized audio to produce capture audio data; and a transmitting unit which transmits the capture audio data to a reproduction device.

A transmission system according to at least one embodiment of the disclosure includes the transmission device and the reproduction device described above.

A computer program product according to one embodiment of the disclosure under which a computer controlling a transmission unit is operated to provide the functions of: a reproduction audio producing unit which produces reproduction audio; a continuous audio producing unit which produces continuous audio; a synthesized audio producing unit which synthesizes the reproduction audio and the continuous audio to produce synthesized audio; a capture audio data producing unit which captures the synthesized audio to produce capture audio data; and a transmission control unit which transmits the capture audio data to a reproduction device by using the transmitting unit.

An information storage medium which stores a program readable by a computer includes the program described above.

According to various embodiments, the transmission device and the like produce continuous audio and transmit capture audio data produced by capturing synthesized audio containing the continuous audio thus produced. Then, the reproduction device receiving the capture audio data can reproduce continuous audio as well regardless of the contents of reproduction audio. Thus, the reproduction device can receive sufficient audio data, and achieve appropriate reproduction of audio.

The continuous audio may be audio continuously outputted and having amplitude equal to or lower than predetermined amplitude.

According to this structure, effect on the reproduction audio imposed by the transmission device can be reduced at the time of reproduction of audio by the reproduction device.

The continuous audio may be audio continuously outputted and having frequency out of an audible range.

According to this structure, effect on the reproduction audio imposed by the transmission device can be reduced at the time of reproduction of audio by the reproduction device.

The transmission device may further includes a capture image data producing unit which captures reproduction image displayed in synchronization with the reproduction audio to produce capture image data. The transmitting unit transmits the capture image data to the reproduction device.

According to this structure, the reproduction device can reproduce the reproduction image and the reproduction audio with appropriate synchronization based on the data transmitted from the transmission device.

The reproduction device may include a reproduction side audio output unit which outputs the synthesized audio based on capture audio data.

According to this structure, the transmission device can output synchronized audio in appropriate synchronization with the reproduction device.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EMBODIMENTS

Embodiments of the disclosure applied to a transmission system including a PC (personal computer) and a projector are hereinafter described with reference to the drawings. The scope of the present disclosure claimed in the appended claims is not limited to the embodiments described herein. All elements shown in the embodiments are not essential for resolutions described in the appended claims.

First Embodiment

Figure 1:
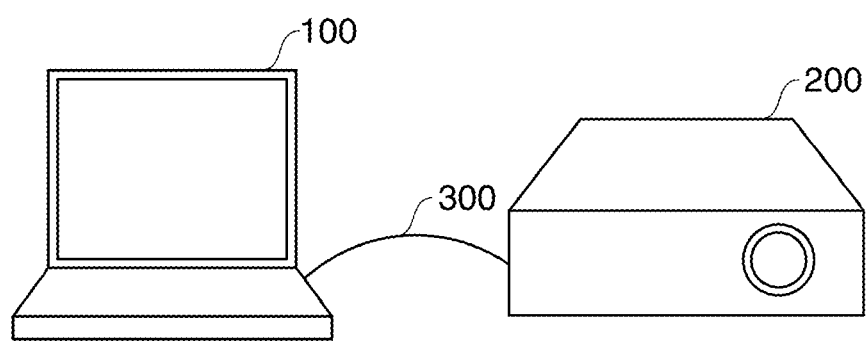
FIG. 1 illustrates external appearance of a transmission system according to a first embodiment.

FIG. 1 is an external view of a transmission system according to a first embodiment. The transmission system includes a PC 100 serving as a kind of a transmission device and a projector 200 as an example of a reproduction device for reproducing audio based on audio data received from the PC 100. The PC 100 and the projector 200 are connected via a USB cable 300.

Figure 2:
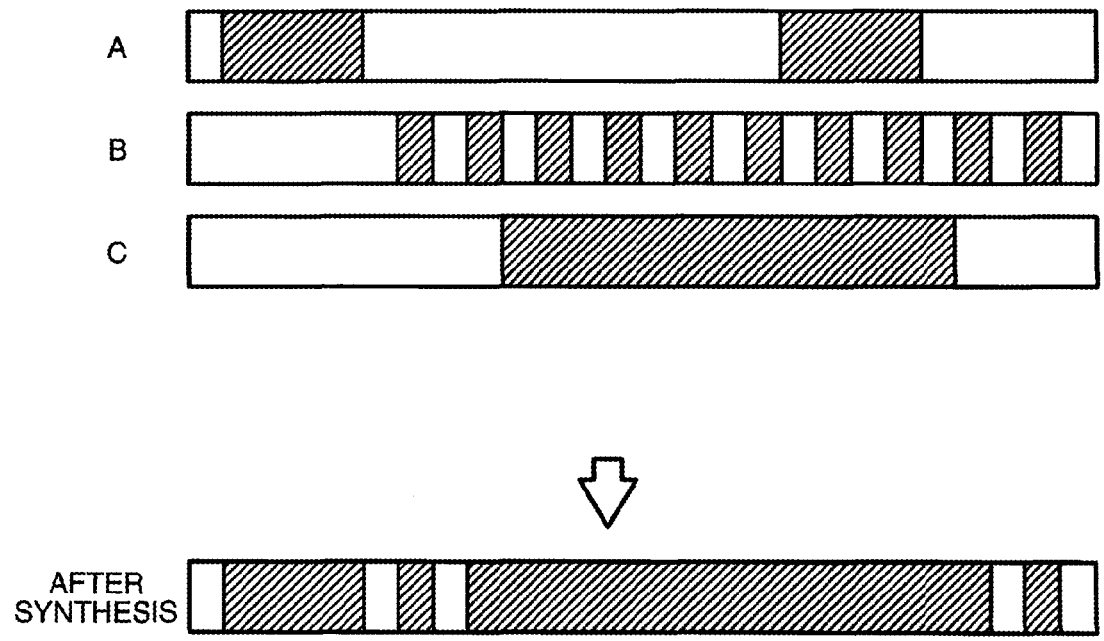
FIG. 2 shows an example of synthesized audio in related art.
Figure 3:
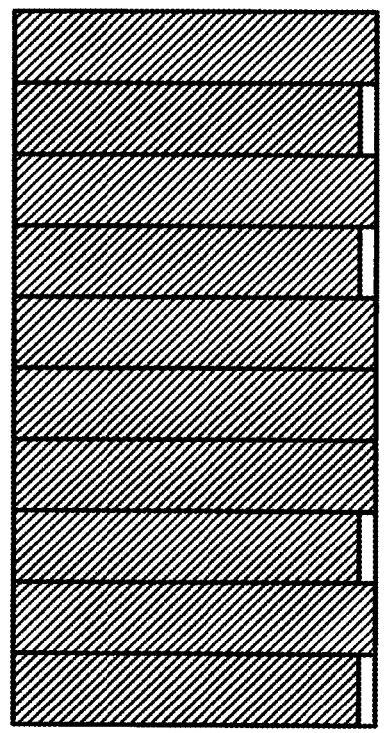
FIG. 3 shows an example of accumulation of audio data in a projector in related art.

FIG. 2 illustrates an example of synthesized audio according to related art. FIG. 3 shows an example of accumulation of audio data in a projector according to related art.

When each of application program A, application program B, and application program C produces audio indicated by shaded portions by a related-art method, for example, portions not containing audio (portions other than the shaded portions) are produced in synthesized audio.

When audio presence and audio absence portions exist, errors are easily produced during audio processing. In this case, the sufficient amount of data required by the projector cannot be captured due to the errors thus produced. The projector reads the lacking data from a buffer every time the data insufficiency occurs. When data reading from the buffer is repeated, the errors are accumulated in the form of loss of remaining data in the buffer. In this case, sufficient data required by the projector cannot be read from the buffer. As a result, audio breaks off in some cases during reproduction of audio by the projector.

Figure 4:
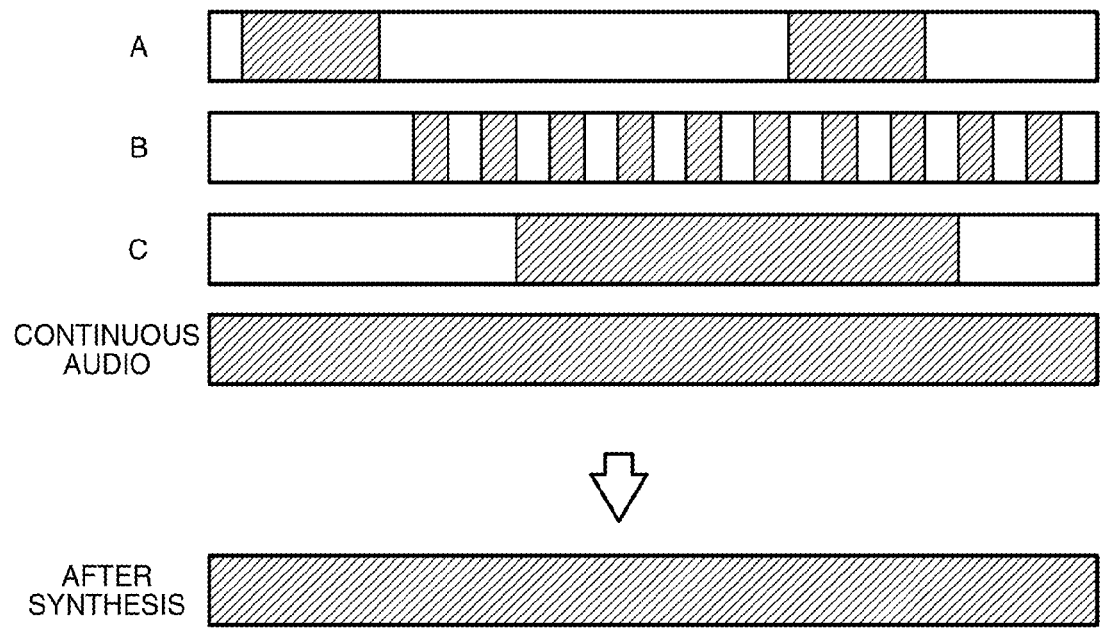
FIG. 4 shows an example of synthesized audio in the first embodiment.
Figure 5:
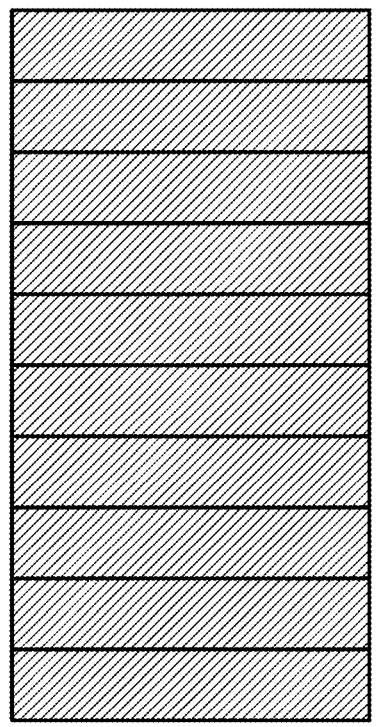
FIG. 5 shows an example of accumulation of audio data in a projector in the first embodiment.

FIG. 4 illustrates an example of synthesized audio according to the first embodiment. FIG. 5 shows an example of accumulation of audio data in the projector according to the first embodiment.

As illustrated in FIG. 4, the PC 100 in this embodiment produces continuous audio continuously outputted and having frequency out of the audible range. In this case, audio absence portion is not generated in the synthesized audio. Thus, no error is produced, and no portion containing no audio data is generated in the buffer area of the projector 200. Accordingly, audio can be appropriately reproduced without break at the time of reproduction of audio by the projector 200.

Figure 6:
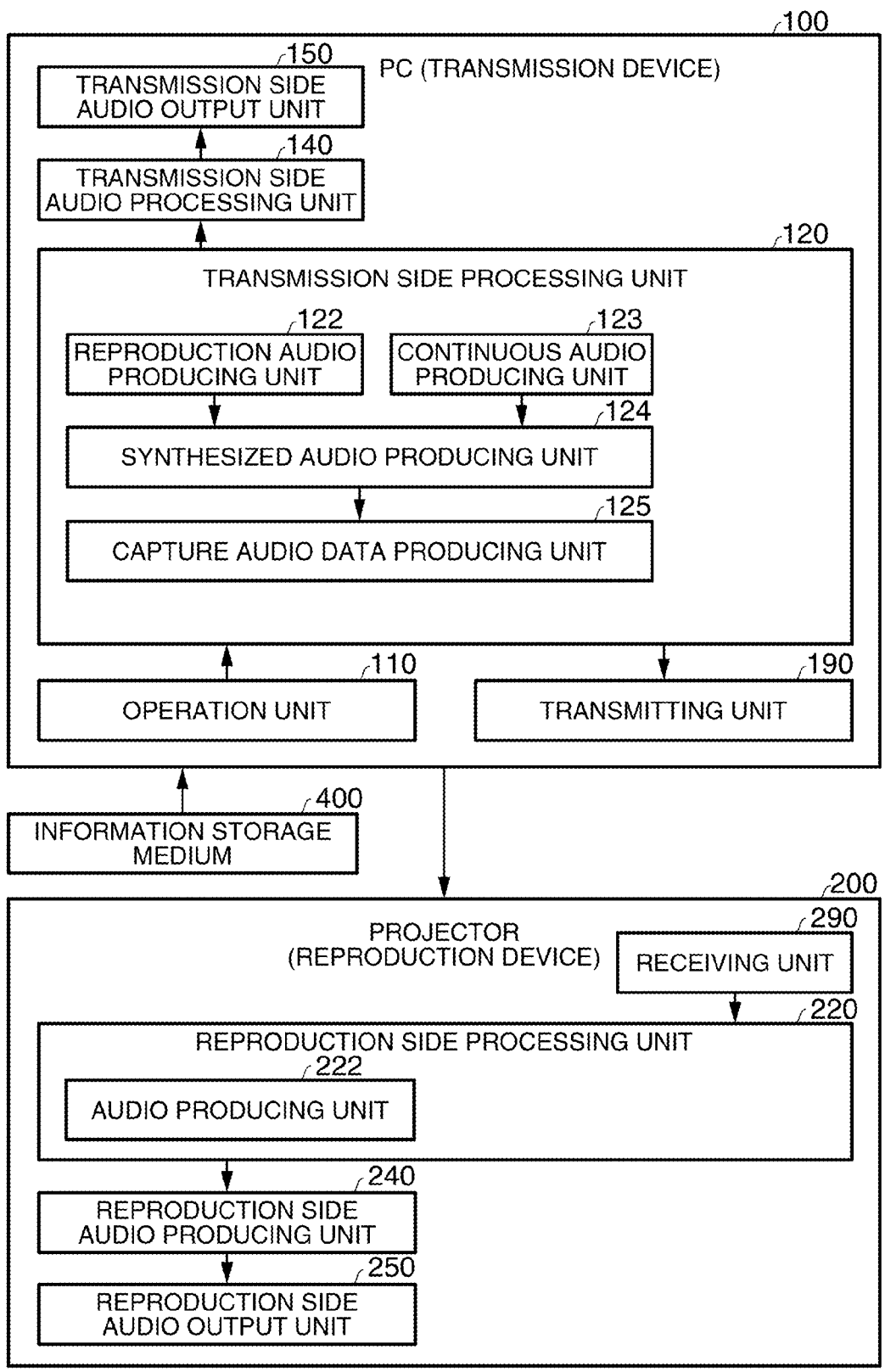
FIG. 6 is a function block diagram showing a transmission system in the first embodiment.

A function block of a transmission system having this function is now discussed. FIG. 6 is a function block diagram of a transmission system according to the first embodiment.

The PC 100 includes an operation unit 110 to which operation command information such as temporary stop is inputted by the user, a transmission side processing unit 120, a transmission side audio processing unit 140, a transmission side audio output unit 150, and a transmitting unit 190 for transmitting capture audio data and the like to the projector 200.

The transmission side processing unit 120 has a reproduction audio producing unit 122 for producing reproduction audio, a continuous audio producing unit 123 for producing continuous audio, a synthesized audio producing unit 124 for synthesizing reproduction audio and continuous audio to produce synthesized audio, and a capture audio data producing unit 125 for capturing synthesized audio to produce capture audio data.

The projector 200 includes a receiving unit 290 for receiving capture audio data and the like, a reproduction side processing unit 220 having an audio producing unit 222, a reproduction side audio processing unit 240, and a reproduction side audio output unit 250.

Hardware for mounting functions of these units on the PC 100 and the projector 200 may be provided by using the following components, for example: CPU and others for the transmission side processing unit 120 and the reproduction side processing unit 220; audio processing circuit and others for the transmission side audio processing unit 140 and the reproduction side audio processing unit 240; speaker and others for the transmission side audio output unit 150 and the reproduction side audio output unit 250; and CPU, USB port and others for the transmitting unit 190 and the receiving unit 290.

More specifically, the CPU performs multimedia reproduction program or the like as the reproduction audio producing unit 122, for example. The CPU also performs continuous audio reproduction program or the like as the continuous audio producing unit 123, and operates audio reproduction API (application program interface) and OS (operating system) as the synthesized audio producing unit 124. Audio driver, virtual audio device, and buffer can be employed as the capture audio data producing unit 125. The CPU can use network communication program, network communication API, OS, network driver, USB communication module and the like for providing the function of the transmitting unit 190 or the receiving unit 290. Also, the CPU can use buffer, audio reproduction program, audio reproduction API, OS, audio driver and the like for providing the function of the audio producing unit 222.

The PC 100 can obtain the functions of the respective units by reading programs from an information storage medium 400. The information storage medium 400 is constituted by CD-ROM, DVD-ROM, ROM, RAM, HDD or the like, for example.

Figure 7:
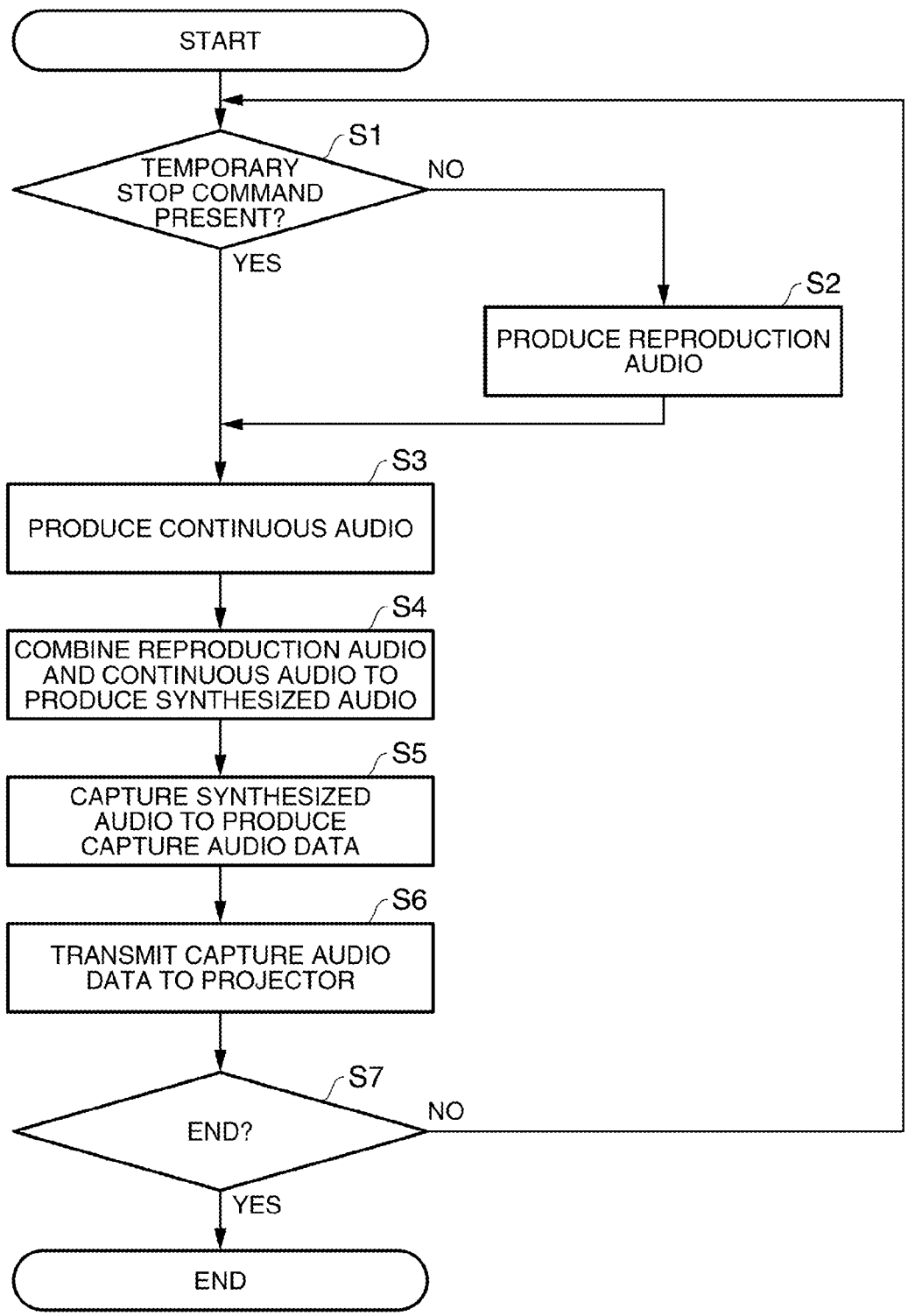
FIG. 7 is a flowchart showing an example of processes performed by a PC in the first embodiment.

The processes such as production and transmission of capture audio data, and reproduction of audio performed by the respective units are now explained. FIG. 7 is a flowchart showing an example of the processes performed by the PC according to the first embodiment.

The reproduction audio producing unit 122 judges whether reproduction temporary stop command has been issued based on information from the operation unit 110 (step S1). When reproduction temporary stop command is not issued, the reproduction audio producing unit 122 produces reproduction audio (step S2). Examples of the reproduction audio include audio reproduced when multimedia reproduction program reads multimedia contents (such as movie on DVD), audio reproduced when CD reproduction program reads audio CD, and audio reproduced when browser reads Web pages having audio reproduction function.

The continuous audio producing unit 123 successively produces audio regardless of presence or absence of temporary stop command (step S3). This audio (continuous audio) is audio continuously outputted and having frequency out of the audible range (generally 20 Hz through 20,000 Hz).

The synthesized audio producing unit 124 produces synthesized audio by successively synthesizing reproduction audio and continuous audio (step S4). Continuous audio is constantly present, but reproduction audio is absent in some cases. Thus, synthesized audio contains only continuous audio when no reproduction audio exists.

The capture audio data producing unit 125 captures synthesized audio and produces capture audio data (step S5). More specifically, the capture audio data producing unit 125 stores synthesized audio in the buffer as data after performing frequency transformation, data length control and other processing for the synthesized audio according to audio reproduction specification, transmission system and the like of the projector 200.

The transmitting unit 190 transmits capture audio data to the projector 200 via the USB cable 300 (step S6).

The transmission side processing unit 120 judges whether the series of processes (steps S1 through S6) are to be finished or not based on reproduction stop command, power source OFF command or the like (step S7). The transmission side processing unit 120 ends the series of processes when these processes are to be finished, and continues the series of processes when these processes are not to be finished.

Figure 8:
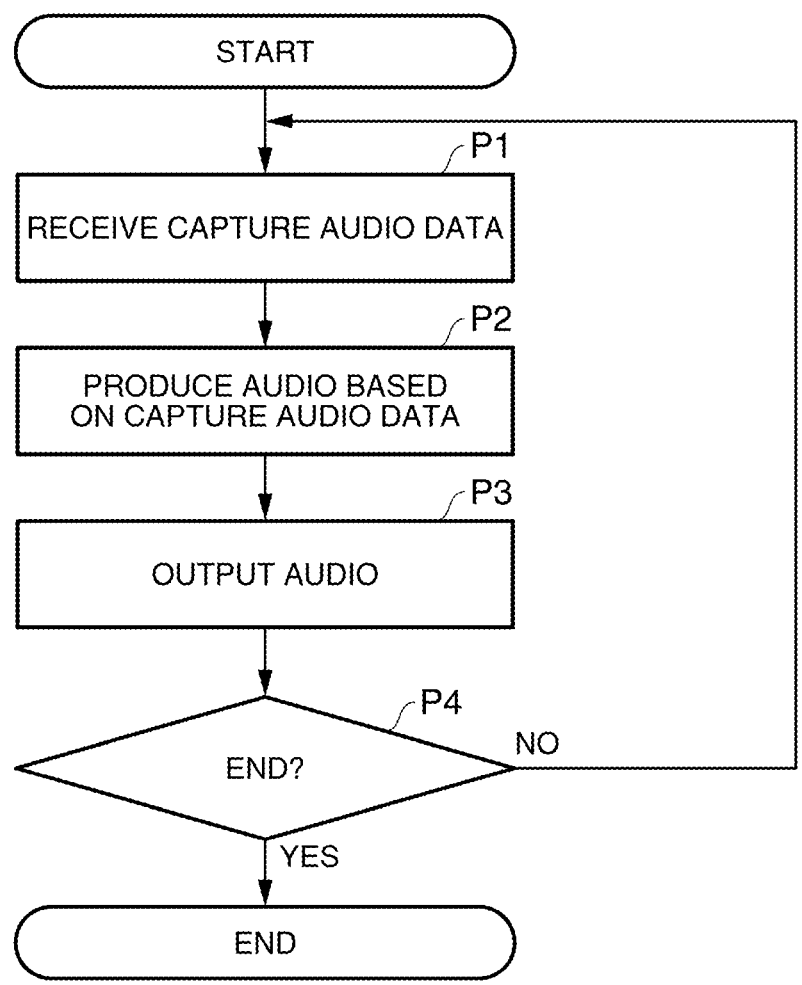
FIG. 8 is a flowchart showing an example of processes performed by the projector in the first embodiment.

The processes performed by the projector are now discussed. FIG. 8 is a flowchart showing an example of the processes performed by the projector according to the first embodiment.

The receiving unit 290 receives capture audio data from the PC 100 (step P1). The audio producing unit 222 sequentially buffers capture audio data, and produces audio based on the capture audio data (step P2).

The reproduction side audio processing unit 240 converts the audio into the form appropriate for outputting, and the reproduction side audio output unit 250 outputs (reproduces) the converted audio (step P3). The reproduction side audio producing unit 240 may perform pre-buffering for a short period (such as 250 milliseconds) immediately after operation start. The projector 200 can absorb increased and decreased variations in the amount of the transmitted capture audio data through the pre-buffering.

The reproduction side processing unit 220 judges whether the series of processes (steps P1 through P3) are to be finished or not based on reproduction stop command, power source OFF command or the like (step P4). The reproduction side processing unit 220 ends the series of processes when these processes are to be finished, and continues the series of processes when these processes are not to be finished.

According to this embodiment, the PC 100 produces continuous audio and transmits capture audio data produced by capturing synthesized audio containing the continuous audio thus produced. Then, the projector 200 receiving the capture audio data can reproduce the continuous audio as well regardless of the contents of reproduction audio. Thus, the projector 200 can receive sufficient audio data, and no vacancy exists in the buffer as in the condition illustrated in FIG. 5. Accordingly, the projector 200 can achieve appropriate reproduction of audio.

The continuous audio is audio having frequency out of the audible range. Thus, the continuous audio is not bothersome for the user listening to the reproduction audio, providing comfortable condition for listening to the reproduction audio by the user.

Second Embodiment

While only audio is captured, transmitted, and reproduced according to the first embodiment, images may be captured, transmitted, and reproduced simultaneously with the processes in the first embodiment.

Figure 9:
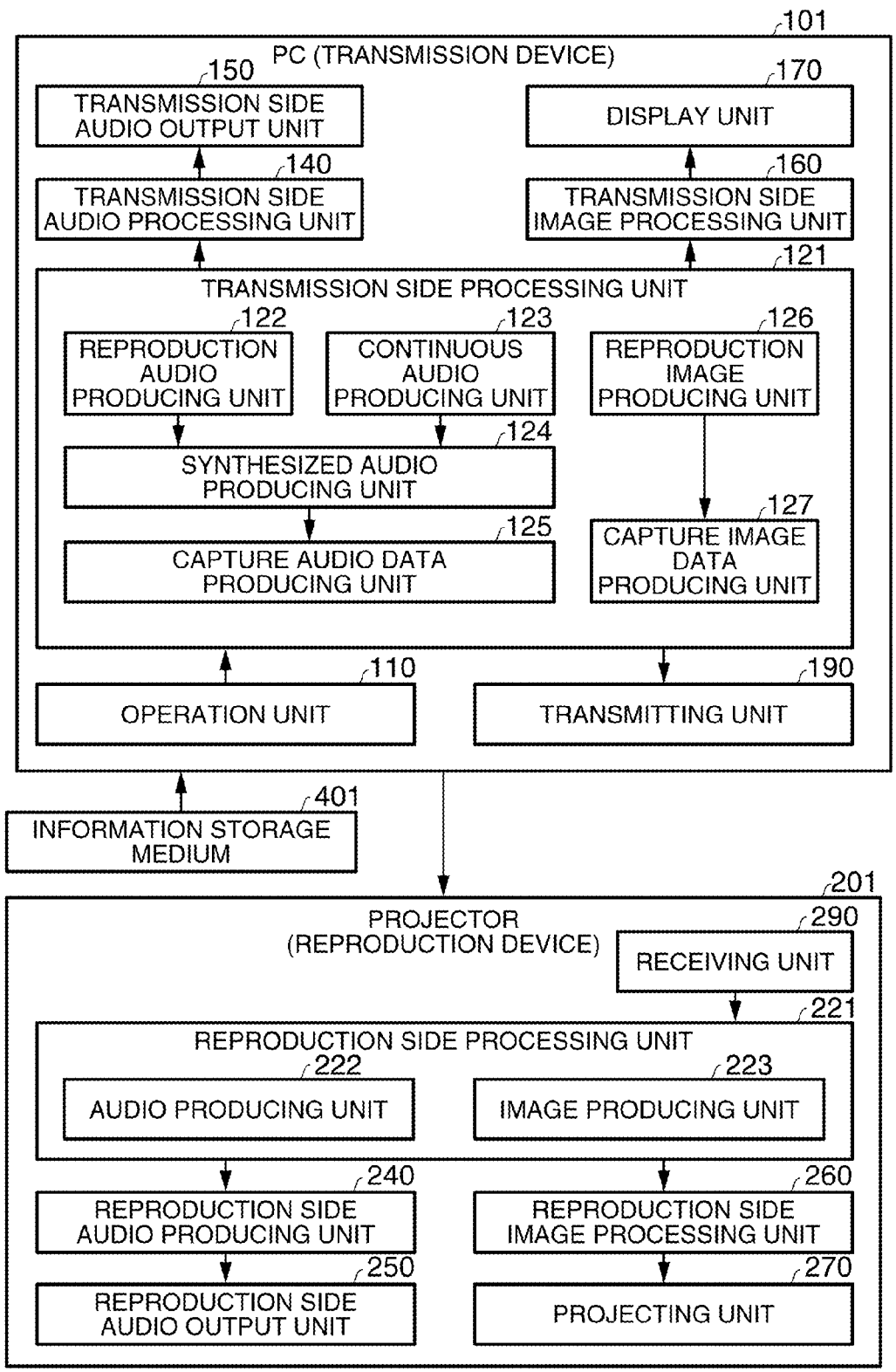
FIG. 9 is a function block diagram showing a transmission system in a second embodiment.

FIG. 9 is a function block diagram showing a transmission system according to a second embodiment. A transmission side processing unit 121 included in a PC 101 has a reproduction image producing unit 126 and a capture image data producing unit 127 in addition to the structure of the transmission side processing unit 120 in the first embodiment. The PC 101 includes a transmission side image processing unit 160 for converting capture image data into the form appropriate for display, and a display unit 170 for displaying images based on the converted image data.

A projector 201 includes a reproduction side image processing unit 260, a projecting unit 270, and an image producing unit 223 within a reproduction side processing unit 221 in addition to the structure of the projector 200 in the first embodiment.

The respective units are constituted by the following components, for example: CPU and others for the reproduction image producing unit 126 and the image producing unit 223; image processing circuit, VRAM and others for the capture image data producing unit 127 and the reproduction side image processing unit 260; lamp, lamp drive circuit, liquid crystal panel, lens and others for the projecting unit 270.

The PC 101 can obtain the functions of the reproduction image producing unit 126 and others by reading programs stored in an information storage medium 401.

The processes for producing and transmitting capture image data and reproducing images and other processes performed by using the respective units are now discussed. The processes for capture audio data are performed in synchronization with the processes for capture image data. The processes for capture audio data are similar to those in the first embodiment, and the same explanation is not repeated herein.

Figure 10:
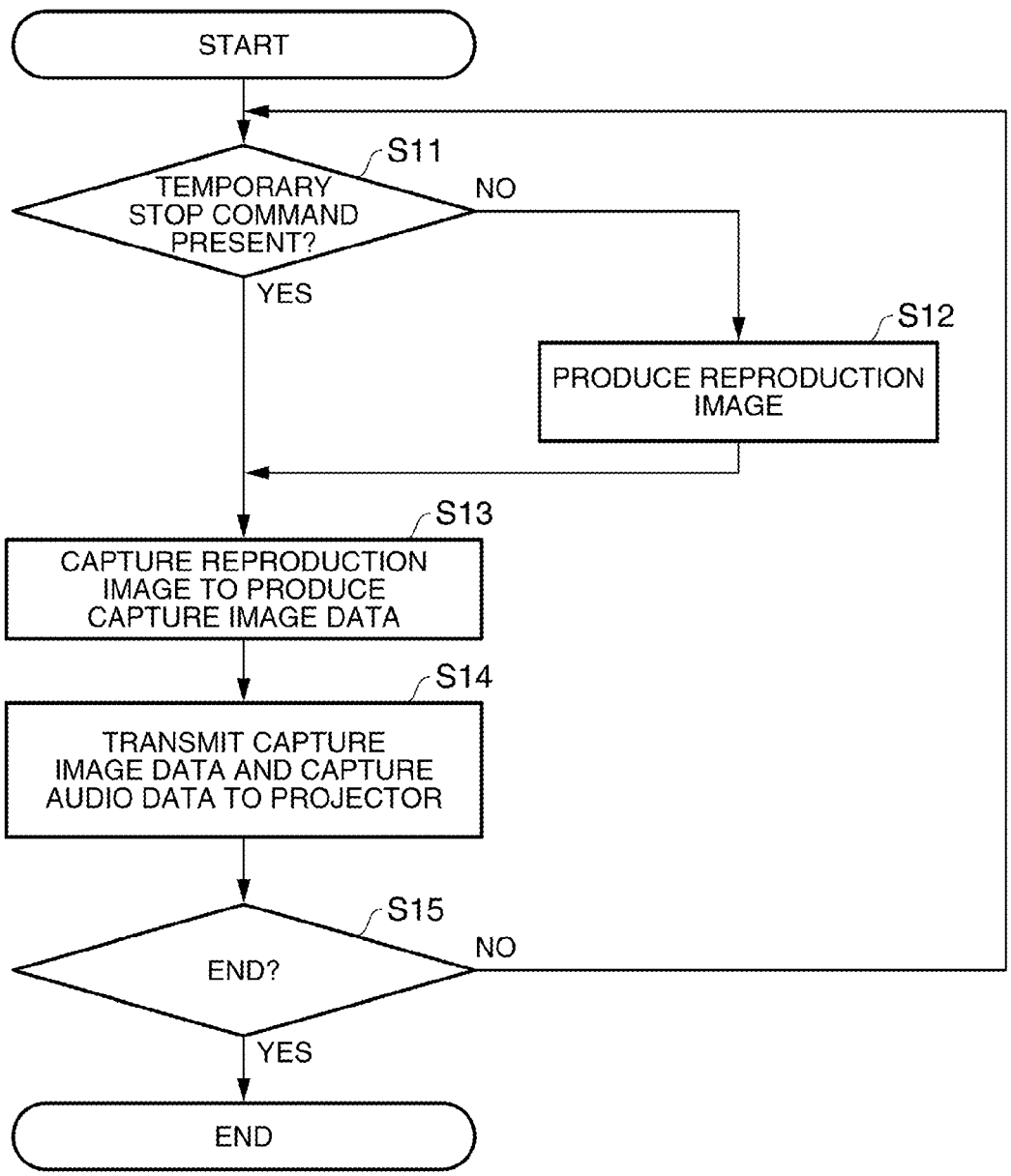
FIG. 10 is a flowchart showing an example of processes performed by a PC in the second embodiment.

FIG. 10 is a flowchart showing an example of the processes performed by the PC in the second embodiment. The reproduction image producing unit 126 judges whether reproduction temporary stop command has been issued based on information from the operation unit 110 (step S11). When reproduction temporary stop command is not issued, the reproduction image producing unit 126 produces reproduction image (step S12). Examples of the reproduction image include image reproduced when multimedia reproduction program reads multimedia contents (such as movie on DVD), and image reproduced by browser.

The capture image data producing unit 127 captures reproduction image and produces capture image data (step S13). More specifically, the capture image data producing unit 127 stores reproduction image in the buffer as data after performing frequency transformation, data length control and other processing for the reproduction image according to image reproduction specification, transmission system and the like of the projector 201.

The transmitting unit 190 transmits the capture image data and capture audio data produced by the capture audio data producing unit 125 to the projector 201 (step S14).

The transmission side processing unit 121 judges whether the series of processes (steps S1 through S6 and steps S11 through S14) are to be finished or not based on reproduction stop command, power source OFF command or the like (step S15). The transmission side processing unit 121 ends the series of processes when these processes are to be finished, and continues the series of processes when these processes are not to be finished.

Figure 11:
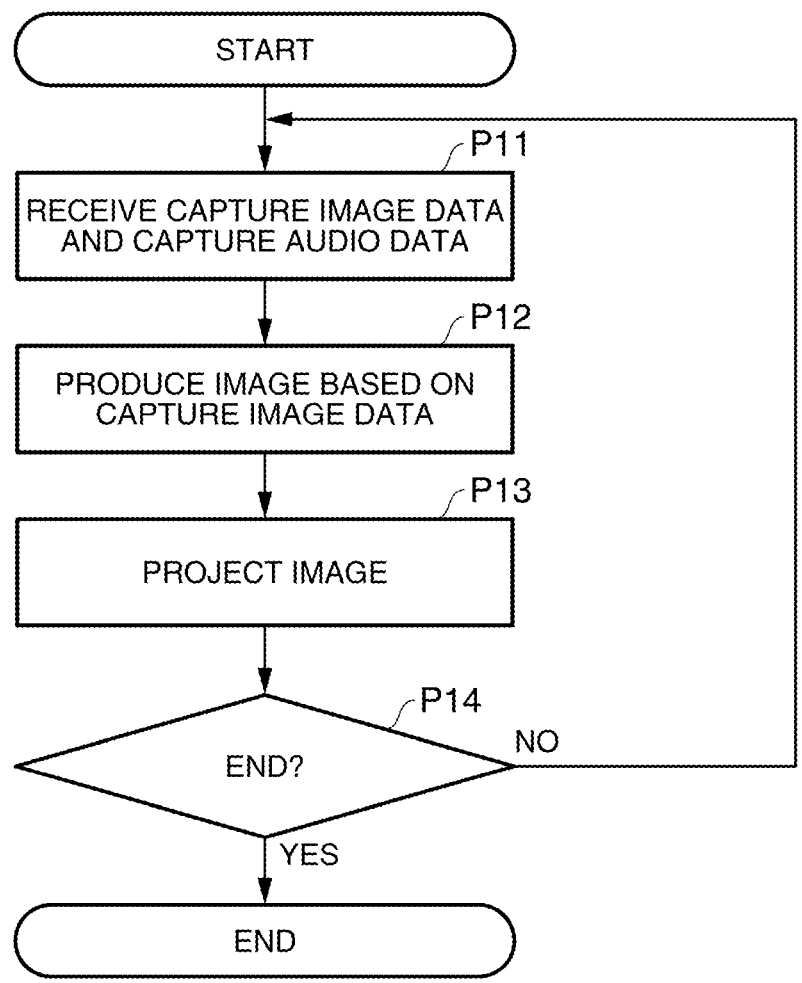
FIG. 11 is a flowchart showing an example of processes performed by a projector in the second embodiment.

The processes performed by the projector are now discussed. FIG. 11 is a flowchart showing an example of the processes performed by the projector in the second embodiment.

The receiving unit 290 receives capture image data and capture audio data from the PC 101 (step P11). The image producing unit 223 sequentially buffers capture image data, and produces image based on the capture image data (step P12).

The reproduction side image processing unit 260 converts the image into the form appropriate for display, and the projecting unit 270 projects (reproduces) the converted image (step P13).

The reproduction side processing unit 221 judges whether the series of processes (steps P1 through P3 and steps P11 through P13) are to be finished or not based on reproduction stop command, power source OFF command or the like (step P14). The reproduction side processing unit 221 ends the series of processes when these processes are to be finished, and continues the series of processes when these processes are not to be finished.

According to this embodiment, the projector 201 can reproduce the reproduction image and reproduction audio with appropriate synchronization based on data received from the PC 101. Particularly in the case of synchronization of image and audio, the observer easily recognizes break off of voices of an actor or actress in the movie. However, no break off of voices is produced in this embodiment, and the projector 201 can achieve reproduction of images and audio with appropriate synchronization.

Other Embodiments

The disclosure is not limited to the embodiments described herein, and various modifications and changes may be made. For example, the transmission side audio processing unit 140 and the transmission side audio output unit 150 may output audio in synchronization with reproduction of audio by the projectors 200 and 201. In this case, the PCs 100 and 101 can output audio in appropriate synchronization with the projectors 200 and 201.

The transmission side image processing unit 160 and the display unit 170 may display images in synchronization with reproduction of images by the projector 201. In this case, the PC 101 can display images in appropriate synchronization with the projector 201.

The continuous audio is not limited to audio having frequency out of the audible range. For example, the continuous audio may be audio having amplitude equal to or lower than predetermined amplitude. In this case, output sound of the continuous audio becomes small, and scarcely interferes with the reproduction audio.

The continuous audio may be audio having amplitude exceeding the predetermined amplitude as long as the audio can be continuously produced regardless of presence or absence of temporary stop command or the like. For example, the continuous audio may be BGM or natural environment sound (such as water flow sound). In this case, the continuous sound scarcely interferes with the reproduction sound.

The transmitting unit 190 may transmit capture audio data and capture image data simultaneously to the plural projectors 200 and 201. In this case, the plural projectors 200 and 201 can reproduce audio and images with appropriate synchronization.

The transmission paths between the PC 100 and 101 and the projectors 200 and 201 are not limited to the USB cable 300, but may be others such as LAN cable. The transmission paths may be provided by the Internet (that is, the PCs 100 and 101 may be located away from the projectors 200 and 201). The transmission paths may be wireless transmission paths.

The transmission device is not limited to the PCs 100 and 101, but may be other various types of device having audio capture function and audio transmission function (such as cellular phone, game machine, and set top box). The reproduction device is not limited to the projectors 200 and 201, but may be other various types of device having audio receiving function and audio reproducing function (such as photoviewer and TV).

The projectors 200 and 201 are not limited to liquid crystal projectors, but may be projectors using DMD (digital micromirror device), for example. The DMD is a trademark of US Texas Instruments Inc.

What is claimed is:

1. A transmission device comprising:
a reproduction audio producing unit which produces reproduction audio;
a continuous audio producing unit which produces continuous audio;
a synthesized audio producing unit which produces synthesized audio, the synthesized audio being synthesized from the reproduction audio and the continuous audio when the reproduction audio is produced, and the synthesized audio being synthesized from the continuous audio when the reproduction audio is not produced;
a capture audio data producing unit which captures the synthesized audio to produce capture audio data;
an operation unit that issues operation command information; and
a transmitting unit which transmits the capture audio data to a reproduction device,
wherein:
the reproduction audio producing unit stops production of the reproduction audio in response to a stop command issued by the operation unit, and
the continuous audio producing unit continues to produce the continuous audio while the production of the reproduction audio is stopped in response to the stop command, and
wherein the continuous audio is audio continuously outputted and having a frequency of less than 20 Hz.

2. The transmission device according to claim 1, wherein the continuous audio is audio continuously outputted and having amplitude equal to or lower than predetermined amplitude.

3. The transmission device of claim 1, wherein the continuous audio is not speech-based.

4. The transmission device according to claim 1, further comprising:
a capture image data producing unit which captures reproduction image displayed in synchronization with the reproduction audio to produce capture image data,
wherein the transmitting unit transmits the capture image data to the reproduction device.

5. The transmission device of claim 4, wherein
the transmitting unit transmits the capture audio data and the capture image data together to the reproduction device, and
the reproduction device is separate from the transmission device.

6. A transmission system comprising:
the transmission device according to claim 1; and
the reproduction device.

7. The transmission system according to claim 6, wherein the reproduction device includes an audio output unit which outputs the synthesized audio based on the capture audio data.

8. A transmission method comprising the steps of:
producing reproduction audio;
producing continuous audio;
stopping production of the reproduction audio in response to a stop command;
continuing to produce the continuous audio while the production of the reproduction audio is stopped in response to the stop command;
producing synthesized audio, the synthesized audio being synthesized from the reproduction audio and the continuous audio when the reproduction audio is produced, and the synthesized audio being synthesized from the continuous audio when the reproduction audio is not produced;

capturing the synthesized audio to produce capture audio data; and transmitting the capture audio data to a reproduction device, wherein the continuous audio is audio continuously outputted and having a frequency of less than 20 Hz.

9. A computer program product embodied in a non-transitory computer readable medium and comprising instructions executable by a computer to control a transmitting unit, the instructions executable to perform the functions of:

producing reproduction audio;

producing continuous audio;

stopping production of the reproduction audio in response to a stop command;

continuing to produce the continuous audio while the production of the reproduction audio is stopped in response to the stop command;

producing synthesized audio, the synthesized audio being synthesized from the reproduction audio and the continuous audio when the reproduction audio is produced, and the synthesized audio being synthesized from the continuous audio when the reproduction audio is not produced;

capturing the synthesized audio to produce capture audio data; and transmitting the capture audio data to a reproduction device, wherein the continuous audio is audio continuously outputted and having a frequency of less than 20 Hz.

* * * * *